United States Patent
Haering et al.

(10) Patent No.: US 6,890,089 B2
(45) Date of Patent: May 10, 2005

(54) LIGHT-GUIDING SYSTEM FOR THE PASSENGER COMPARTMENT OF A MOTOR VEHICLE

(75) Inventors: Jochen Haering, Constance (DE); Werner Scherber, Bermatingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/140,844

(22) Filed: May 8, 2002

(65) Prior Publication Data

US 2002/0167820 A1 Nov. 14, 2002

(30) Foreign Application Priority Data

May 12, 2001 (DE) .......................... 101 23 236

(51) Int. Cl.$^7$ ................................. B60Q 3/02
(52) U.S. Cl. ................... 362/490; 362/479; 362/31; 362/511
(58) Field of Search ............... 362/479, 488, 362/490, 31, 493, 511, 330, 336, 337

(56) References Cited

U.S. PATENT DOCUMENTS

| | | | | |
|---|---|---|---|---|
| 4,195,907 A | * | 4/1980 | Zamja et al. ............... 385/125 |
| 4,466,697 A | * | 8/1984 | Daniel ......................... 385/123 |
| 4,637,686 A | * | 1/1987 | Iwamoto et al. ............. 385/128 |
| 4,830,899 A | * | 5/1989 | Nakahashi et al. ......... 428/137 |
| 5,027,258 A | * | 6/1991 | Schoniger et al. ............ 362/31 |
| 5,079,675 A | * | 1/1992 | Nakayama ................... 3662/31 |
| 5,101,325 A | * | 3/1992 | Davenport et al. ........... 362/31 |
| 5,375,043 A | * | 12/1994 | Tokunaga ..................... 362/31 |
| 5,548,492 A | | 8/1996 | Hansen et al. .............. 362/83.1 |
| 5,647,657 A | | 7/1997 | Damasky et al. ............. 362/32 |
| 5,881,201 A | * | 3/1999 | Khanarian .................. 385/146 |
| 6,011,602 A | * | 1/2000 | Miyashita et al. ............ 349/65 |
| 6,152,569 A | | 11/2000 | Aizawa ........................ 362/27 |
| 6,331,065 B1 | * | 12/2001 | Wilms ......................... 362/493 |
| 6,535,337 B1 | * | 3/2003 | Tanaka et al. .............. 359/599 |
| 2001/0030871 A1 | * | 10/2001 | Anderson et al. ........... 362/488 |
| 2001/0033913 A1 | * | 10/2001 | Murata et al. .............. 428/143 |
| 2002/0172810 A1 | * | 11/2002 | Murata et al. .............. 428/204 |

FOREIGN PATENT DOCUMENTS

| | | | | |
|---|---|---|---|---|
| DE | 3703847 A1 | * | 8/1988 | ............ B60Q/3/02 |
| DE | 4439547 | | 5/1996 | |
| DE | 19831002 | | 4/2000 | |
| DE | 19852593 | | 5/2000 | |
| DE | 19900622 | | 8/2000 | |
| DE | 19936358 | | 3/2001 | |
| DE | 20019073 | | 3/2001 | |
| EP | 0515921 | | 8/1996 | |
| JP | 59011934 A | * | 1/1984 | ............ B60Q/3/02 |
| JP | 2000127847 | | 5/2000 | |
| JP | 2000331522 A | * | 11/2000 | ............ F21V/8/00 |

* cited by examiner

Primary Examiner—Sandra O'Shea
Assistant Examiner—Hargobind S. Sawhney
(74) Attorney, Agent, or Firm—Davidson, Davidson & Kappel, LLC

(57) ABSTRACT

The present invention relates to a light-guiding system for improving the lighting conditions of the passenger compartment of a motor vehicle, including a light-generating unit (3) which can be switched on and off electrically and a light guide (5) which is used for guiding the light and which is coupled to the light-generating unit (3) for coupling in the light. According to the present invention, the light guide (5) is arranged in the area of the interior lining of the vehicle roof (1) and designed as a flat light guide, the light being coupled in at one or more lateral surfaces (7, 8) of the light guide (5); and the flat light guide (5) being prepared such that the light couples out of the light guide (5) into the passenger compartment (2) of the vehicle over a large surface and in a homogeneous manner.

13 Claims, 1 Drawing Sheet

LIGHT-GUIDING SYSTEM FOR THE PASSENGER COMPARTMENT OF A MOTOR VEHICLE

Priority to German Patent Application No. 101 23 263.2-42, filed May 12, 2002 and incorporated by reference herein, is claimed.

BACKGROUND INFORMATION

The present invention relates to a light-guiding system for improving the lighting conditions of the passenger compartment of a motor vehicle.

Motor vehicles are equipped with increasingly large sliding glass sunroofs or panoramic glass roofs in spite of adversities regarding air conditioning engineering such as overheating of the vehicle cabin during intensive insolation or cooling off toward the cold night sky. The reason is the spacious and friendly room atmosphere resulting for the passengers in a bright, light-flooded passenger compartment. Conventional closed roof linings illuminate the passenger compartment only indirectly by the stray light which falls into the passenger compartment through the side windows. Due to the strong contrast against the bright surroundings, therefore, the conventional roof linings appear relatively dark and have an oppressive effect on the driver.

German Patent No. 44 39 547 describes a light system for the passenger compartment of motor vehicles, in which surfaces and objects (for example, pushbuttons such as door light and warning light, door exit lights or interior light) in the passenger compartment are illuminated directly or indirectly via fiber optic guides.

SUMMARY OF THE INVENTION

The object of the present invention is to improve the lighting conditions in the passenger compartment of the vehicle and to provide a pleasant room atmosphere for the driver in the case of a closed roof lining.

The present invention provides a light-guiding system for improving the lighting conditions in the passenger compartment of a motor vehicle, comprising a light-generating unit (3) which can be switched on and off electrically and a light guide (5) which is used for guiding the light and which is coupled to the light-generating unit (3) for coupling in the light. The light guide (5) is arranged in the area of the interior lining of the vehicle roof (1) and is designed as a flat light guide, the light being coupled in at one or more lateral surfaces (7, 8) of the light guide (5). The flat light guide (5) is prepared such that the light couples out of the light guide (5) into the passenger compartment (2) of the vehicle over a large surface and in a homogeneous manner.

Unlike conventional light sources such as incandescent lamps, the light guide according to the present invention therefore does not serve as a lighting element but produces a large-surface and glare-free brightening of the roof lining in the overhead area of the vehicle occupants. Because of this, the light guide according to the present invention produces an apparent enlargement of the passenger compartment, creating a pleasant room atmosphere in this manner. The advantage of this is that the homogenous brightening of the passenger compartment by the light guide according to the present invention in the area of the roof lining, which will also be referred to as luminous roof hereinafter, a positive psychophysiological effect on the vehicle occupants is achieved.

It is also advantageous that this positive effect on the vehicle occupants is achieved not only in daylight but also in the dark, for example, when driving in tunnels or at night. Using the luminous roof according to the present invention, it is possible to achieve a glare-free brightening of the passenger compartment in darkness, as a result of which the orientation of the vehicle occupants is improved. Besides, the pleasant room atmosphere created by the luminous roof ensures attentive and stress-free driving in darkness.

A further advantage of the luminous roof according to the present invention is that it can be used as a component of the overall vehicle. Moreover, the luminous roof can also be used as a design element in the passenger compartment of the vehicle.

It is advantageous for the flat light guide to be a transparent thermoplastic, in particular, polymethyl methacrylate (PMMA), which is also known as Plexiglas™, or polycarbonate (PC). The advantage of this material is that the material can be adapted in the form of sheets to the shape of common roof structures.

The range, the color, and the intensity of the light conveyed in such light guides are determined by the aspect ratio, the ratio of length to thickness or diameter of the light guide, apart from the absorption coefficient of the base material, that is, of the thermoplastic used. It is particularly advantageous for the used thermoplastics to have material thicknesses of 0.1 to 5 cm, in particular, of 0.3 to 1.5 cm. For lining usual vehicle roofs, the width of the thermoplastics is advantageously between 1 and 3 m.

By structuring the light guide in an advantageous manner, it is achieved that the luminous intensity which is guided in the light guide is coupled out into the passenger compartment in a homogenous manner and over a large surface.

In an advantageous embodiment of the present invention, the surface of the flat light guide facing away from the passenger compartment of the vehicle is structured by roughening, embossing, or boring. However, it is also possible to structure the surface facing the passenger compartment or to structure both surfaces. Pyramid, wedge or cone structures having an edge length which is markedly larger than the wavelength of the visible light, in particular, between 1 $\mu$m and 3 mm as well as an angle of inclination between 20° and 70° are particularly suitable for this. Thus, it is possible for the light guided in the light guide to be deflected at the structured surfaces of the light guide and to be guided into the passenger compartment of the vehicle. The intensity and radiation characteristic can be varied and adapted via the shape, the density (number of structures per surface unit), and the depth of the surface structures. A homogeneous brightening of the roof lining can be achieved, in particular, by small structure depths and of small density.

In a further advantageous embodiment of the present invention, scattering centers are introduced into the light guide for coupling out the light which is guided in the light guide. In this context, the scattering centers can advantageously be highly refractive pigments such as $TiO_2$ or air inclusions having a particle size larger than the light wavelength, in particular, between 1 $\mu$m and 3 mm. Due to the discontinuity of the refractive index between the light guide, that is, the thermoplastic, and the scattering center, the light which is guided in the light guide is deflected at these scattering centers. The scattering centers can also be advantageously designed as fibers or colored particles.

However, the scattering centers can also advantageously be particles having a particle size below the light wavelength, in particular, smaller than 300 nm. In this case, the deflection of the light is determined by Rayleigh scattering with an isotropic scattering angle distribution. A part of the scattered light gets directly into the passenger compartment of the vehicle. The part of light which is scattered in the direction of the vehicle roof, can advantageously be reflected back into the light guide via a reflecting cover which is arranged between the vehicle roof and the light guide and which is not in optical contact with the light guide. It is, of course, also possible that the interior lining of the vehicle roof has reflective properties. In this manner, it is possible to minimize losses and to increase the component of light which is guided in the direction of the passenger compartment.

However, it is also possible for the scattering centers in the light guide to be a combination of scattering centers having a particle size larger than the light wavelength and scattering centers having a particle size smaller than the light wavelength. It is, of course, also possible to introduce scattering centers into a light guide whose surface is structured.

An appearance of the luminous roof according to the present invention which is particularly homogenous from all viewing angles is advantageously achieved by a diffusing panel which is additionally attached to the surface of the light guide facing the passenger compartment of the vehicle. In this context, the diffusing panel is arranged, in particular, in such a manner that it is not in optical contact with the light guide. This diffusing panel acts as a diffuser when backlighted by the luminous roof according to the present invention so that the discrete scattering centers or surface structures are not separately resolved by the vehicle occupants.

According to the present invention, the light which is produced in the light-generating units is coupled in at one or more lateral surfaces of the flat light guide. In this context, the light is coupled into the light guide at an angle below the critical angle of total reflection. In this manner, reflection at the lateral surfaces of the light guide is prevented. The lateral surfaces of the light guide into which no light is coupled in can, for example, be blackened or mirrored. Therefore, the light which is guided through the light guide is absorbed or reflected back into the light guide at the lateral surfaces.

The light from the light-generating units can advantageously be coupled into the flat light guide via a reflector system and/or mask system. By the reflectors and/or masks, the radiation characteristic of the light-generating units is adapted in such a manner that a direct illumination of the passenger compartment by the light-generating units is avoided.

Advantageously, it is possible to use one or more fluorescent tubes, lighting cords, or light-emitting diodes as light-generating units. The advantage of these light sources is the small overall depth which permits space-saving installation into the vehicle. The light-generating units can be placed, for example, in the lateral side rails of the vehicle.

In another advantageous embodiment of the present invention, provision is made for an electric control loop including a brightness sensor which adapt the luminous intensity which is radiated into the passenger compartment of the vehicle to the ambient brightness. Thus, an adaptive bright roof lining is provided by the luminous roof according to the present invention.

The light-generating units can advantageously be integrated in the flat light guide in the luminous roof according to the present invention. Besides, it is possible for the reflector system and/or mask system to be integrated in the flat light guide. The advantage is that it is possible to produce a continuous unit in this manner. Thus, a compact and mechanically stable overall system is produced which is easy to manufacture and to adapt to roof structures of arbitrary shape in the vehicle.

BRIEF DESCRIPTION OF THE DRAWINGS

In the following, the present invention will be explained in greater detail with reference to the drawings, in which.

DETAILED DESCRIPTION

Figure 1:
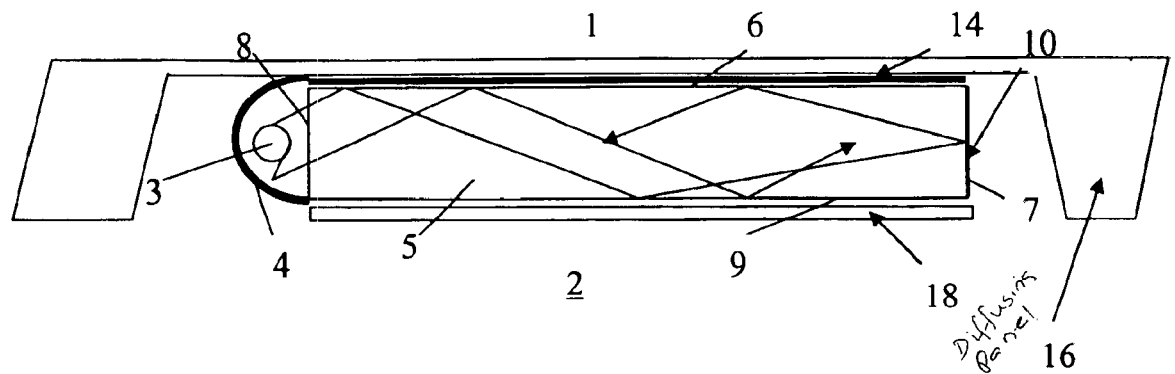
FIG. 1 is a lateral view of a first embodiment of a luminous roof according to the present invention with light-generating unit and reflector system.

FIG. 1 is a lateral view of a first embodiment of a luminous roof according to the present invention in. A transparent flat light guide 5 is arranged below closed vehicle roof 1 in an area of an interior lining 16 of the roof. The light of a light-generating unit 3, for example, a fluorescent tube, enters light guide 5 through lateral surface 8. A reflecting cover 14 is situated between vehicle roof 1 and lateral surface 6 through which no light is coupled into light guide 5. In this manner, it is achieved that the light exiting surface 6 of light guide 5 is reflected at cover 14 and guided back into light guide 5. Optionally, diffusing panel 18 is additionally attached to the surface of the light guide facing the passenger compartment 2 of the vehicle. Preferably, the diffusing panel is arranged in such a manner that it is not in optical contact with the light guide. This diffusing panel acts as a diffuser when backlighted by the light guide 5 so that discrete scattering centers or surface structures are not separately resolved by the vehicle occupants.

Light-generating unit 3 is surrounded by a reflector system 4 whereby the light is prevented from radiating directly into passenger compartment 2. Therefore, the light enters light guide 5 directly through lateral surface 8.

Figure 2:
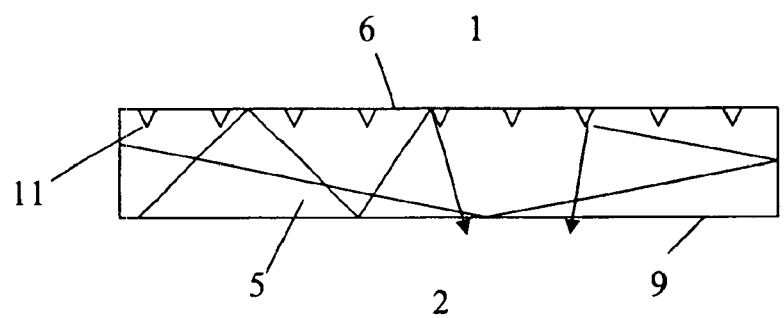
FIG. 2 is a lateral view of a second embodiment of a luminous roof according to the present invention with structured light guide surface.

FIG. 2 is a lateral view of a second embodiment of the luminous roof according to the present invention. Surface 6 of light guide 5 facing closed vehicle roof 1 features wedge-shaped structures 11. In this context, the depth of the structures is markedly smaller than the thickness of the light guide. The light which is guided in light guide 5 is scattered at these structures 11 in such a manner that it impinges upon surface 9 of light guide 5 at an angle below the angle of total reflection, whereby the light is coupled out into passenger compartment 2.

Figure 3:
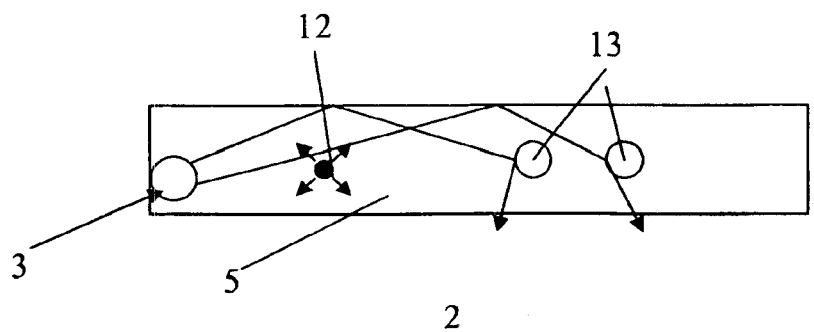
FIG. 3 is a lateral view of a third embodiment of a luminous roof according to the present invention with integrated scattering centers.

A third embodiment of the luminous roof according to the present invention is shown in FIG. 3. Light generating unit 3 is integrated in flat light guide 5. Scattering centers 12 having a size smaller than the light wavelength and scattering centers 13 having a size larger than the light wavelength are introduced in flat light guide 5. The light is scattered at scattering centers 12, 13 and guided into passenger compartment 2.

What is claimed is:

1. A light-guiding system for improving the lighting conditions in the passenger compartment of a motor vehicle, comprising:

a light-generating unit for generating light and capable of being switched on and off electrically; and a flat light guide having lateral edge surfaces, the light guide for guiding the light, the light guide being coupled to the light-generating unit for coupling in the light, the light guide being arranged in an area of an interior lining of a roof of the motor vehicle, the light being coupled in at one or more of the lateral surfaces and coupled out of the light guide into the passenger compartment of the vehicle over a large surface in a homogeneous manner, the light guide having a flat surface facing away from the passenger compartment and being structured by roughening, embossing, or boring with a plurality of structures, each of the structures having one of a pyramid shape, a wedge shape and a cone shape and having an edge length of said structure between 1 μm and 3 μm and an angle inclination between 20° and 70°.

2. The light-guiding system as recited in claim 1, wherein the flat light guide includes a transparent thermoplastic.

3. The light-guiding system as recited in claim 2, wherein the thermoplastic is polymethyl methacrylate or polycarbonate.

4. The light-guiding system as recited in claim 1, wherein the light guide has a thickness of 0.1 to 5 cm and a width of 1 to 3 m.

5. The light guiding-system as recited in claim 4, wherein the thickness is between 0.3 and 1.5 cm.

6. The light-guiding system as recited in claim 1, wherein the light-generating unit is one or more fluorescent tubes, lighting cords, or light-emitting diodes.

7. The light-guiding system as recited in claim 1, wherein the light-generating unit is integrated in the flat light guide.

8. A light-guiding system for improving the lighting conditions in the passenger compartment of a motor vehicle, comprising:
   a light-generating unit for generating light and capable of being switched on and off electrically; and
   a flat light guide having lateral edge surfaces, the light guide for guiding the light, the light guide being coupled to the light-generating unit for coupling in the light, the light guide being arranged in an area of an interior lining of a roof of the motor vehicle, the light being coupled in at one or more of the lateral surfaces and coupled out of the light guide into the passenger compartment of the vehicle over a large surface in a homogeneous manner, the light guide having a surface facing away from the passenger compartment including a plurality of structures, each of the structures having one of a pyramid, a wedge and a cone shape and having an edge length of said structure between 1 μm and 3 μm and an angle inclination between 20° and 70°; and
   a reflecting cover situated between the roof and the light guide, the reflecting cover not being in optical contact with the light guide.

9. The light-guiding system as recited in claim 8, wherein the light-generating unit is one or more fluorescent tubes, lighting cords, or light-emitting diodes.

10. The light-guiding system as recited in claim 8, wherein the light-generating unit is integrated in the flat light guide.

11. A light-guiding system for improving the lighting conditions in the passenger compartment of a motor vehicle, comprising:
   a light-generating unit for generating light and capable of being switched on and off electrically; and
   a flat light guide having lateral edge surfaces, the light guide for guiding the light, the light guide being coupled to the light-generating unit for coupling in the light, the light guide being arranged in an area of an interior lining of a roof of the motor vehicle, the light being coupled in at one or more of the lateral surfaces and coupled out of the light guide into the passenger compartment of the vehicle over a large surface in a homogeneous manner, the light guide having a surface facing away from the passenger compartment including a plurality of structures, each of the structures having one of a pyramid, a wedge and a cone shape and having an edge length of said structure between 1 μm and 3 μm and an angle inclination between 20° and 70°; and
   a diffusing panel arranged on a surface of the light guide facing the passenger compartment of the vehicle, the diffusing panel not being in optical contact with the light guide.

12. The light-guiding system as recited in claim 11, wherein the light-generating unit is one or more fluorescent tubes, lighting cords, or light-emitting diodes.

13. The light-guiding system as recited in claim 11, wherein the light-generating unit is integrated in the flat light guide.

* * * * *